United States Patent Office 3,463,745
Patented Aug. 26, 1969

3,463,745
POLYURETHANE SPONGE AND PROCESS THEREFOR
Charles H. Hofrichter, Madison, and Thomas I. Haggerty, West Haven, Conn., and Gerald W. Zimmer, Rush, N.Y., assignors to Olin Mathieson Chemical Corporation
No Drawing. Filed Dec. 29, 1966, Ser. No. 605,556
Int. Cl. C08g 22/16, 22/04
U.S. Cl. 260—2.5    2 Claims

ABSTRACT OF THE DISCLOSURE

Compositions comprising a mixture of a polyether polyol and a surfactant compound comprising the reaction product of glycidol or ethylene oxide and an alkyl phenol are disclosed; these compositions are employed in the preparation of hydrophilic polyurethane foams.

---

This invention relates to hydrophilic polyurethane foams and to a process for preparing them.

Polyurethane foams prepared by conventional techniques, i.e., reaction of a polyether polyol and an organic isocyanate in the presence of a suitable catalyst and foaming agent, are hydrophobic in nature and are not readily wetted by water. As a result of this shortcoming, urethane foams have not captured any sizable portion of the sponge market or other markets where soft, absorbent, resilient hydrophilic materials are desired.

One attempt to impart hydrophilic properties to urethane foams involves impregnating polyurethane foams with a material having hydrophilic properties such as polyacrolein. Although this technique has some effect upon imparting hydrophilic properties to polyurethane foam, disadvantages of this process include the following:

(1) The impregnation step adds an additional expense to the cost of preparing the foam;

(2) It is difficult to uniformly impregnate the urethane foam with the hydrophilic agent; and (3) The hydrophilic agent has a tendency to be leached from the urethane foam after frequent contact with liquid, which results in a significant decrease in the hydrophilic properties.

It is a primary object of this inventiton to provide hydrophilic polyurethane foams from a wide variety of polyether polyols.

A further object of this invention is to provide an improved process for preparing hydrophilic polyurethane foams.

These and other objects of this invention are apparent from the following detailed description thereof.

It has now been discovered that the foregoing objects are accomplished by reacting a polyether polyol and an alkyl phenol based surfactant with an organic polyisocyanate in the presence of a catalyst and a foaming agent. The resulting polyurethane foam is flexible and has good hydrophilic properties.

The alkyl phenol-based surfactant employed in the process of this invention is the reaction product of glycidol or ethylene oxide and alkyl phenol, said alkyl phenol having the following general formula:

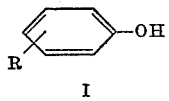

I wherein R is an alkyl group having from 8 to 18 carbon atoms. Illustrative of the alkyl phenols I suitable in preparing the surfactant compounds of this invention are octyl phenol, nonyl phenol, decyl phenol, dodecylphenol, isomers thereof, mixtures thereof and the like.

The surfactant compound is prepared by reacting a hydrophilic compound selected from the group consisting of glycidol and ethylene oxide with alkyl phenol I, preferably in the presence of an alkaline catalyst such as the alkali metals and the oxides, hydroxides, alkoxides and phenoxides thereof. Where ethylene oxide is employed as the hydrophilic component, the surfactant compound is provided by reacting between about 6 and 35 moles of ethylene oxide per mole of alkyl phenol and preferably between about 7 and about 15 moles. The glycidol-alkyl phenol surfactant is prepared by reacting between about 1 and about 30 and preferably between about 3 and 10 moles of glycidol per mole of alkyl phenol.

The proportion of alkyl phenol-based surfactant compound employed in preparing the polyurethane foams of this invention is generally in the range between 1 and 10 parts by weight of a glycidol-alkyl phenol compound per 100 parts by weight of the polyether polyol and preferably between about 2 and about 7 parts per 100 parts of polyol. The ethylene oxide-alkyl phenol compound is employed in the range between 5 and 40 parts per 100 parts of polyol, with between 15 and 30 parts being preferred. The surfactant compound and the polyether polyol can be "premixed" in these proportions to provide a polyurethane foam forming reactant or else each component can be added separately when forming the foam.

The polyether polyol employed in the preparation of the polyurethane foams of this invention is dependent on the nature of the alkyl phenol-based surfactant compound. Thus, where a glycidol-alkyl phenol surfactant is employed, any polyether polyol generally utilized in polyurethane foam formulating processes can be used. Exemplificative polyether polyols are described in U.S. Patents 3,072,582, issued Jan. 8, 1963 to C. B. Frost and 3,095,386, issued June 25, 1963 to G. A. Hudson. However, preferred embodiments utilize polyether polyols containing oxyalkylene substituents. These preferred polyols are prepared by reacting an alkylene oxide, such as ethylene oxide, propylene oxide, butylene oxide, glycidol, mixtures thereof and the like, with a reactive hydrogen compound having from two to about six reactive hydrogen atoms and having not over six carbon atoms per molecule, and being selected from the group consisting of aliphatic polyhydric alcohols, alkylene amines, alkylene polyamines, cyclic amines, amides and polycarboxylic acids. Aliphatic polyhydric alcohols constitute one class of reactive hydrogen compounds that is especially useful in preparing the compositions of this invention. Such alcohols can have from about 2 to 6, inclusive, carbon atoms per molecule, and examples of these materials are ethylene glycol, pentaerythritol, methyl glucoside, propylene glycol, 2,3-butylene glycol, 1,3-butylene glycol, 1,5-pentanediol, 1,6-hexanediol, glycerol, trimethylolpropane, sorbitol, sucrose and the like. Another class of reactive hydrogen compounds that can be used is the alkylamines and alkylene polyamines having at least 2 reactive hydrogen atoms, such as methylamine, ethylamine, propylamine, butylamine, hexylamine, ethylenediamine, 1,6-hexanediamine, diethylenetriamine, and the like. Also, such cyclic amines as piperazine, 2-methylpiperazine and 2,5-dimethylpiperazine can also be used. Amides constitute a further class of such reactive hydrogen compounds, such as acetamide, succinamide and benzenesulfonamide. A still further class of such reactive hydrogen compounds is the di- and polycarboxylic acids, such as adipic acid, succinic acid, glutaric acid, aconitric acid, diglycollic acid, and the like. It will be recognized that the reactive hydrogen compound can be one containing different functional groups having reactive hydrogen atoms, also, such as citric acid, glycollic acid, ethanolamine, and the like.

Sufficient alkylene oxide is reacted with the reactive hydrogen compound to form a polyether polyol having a molecular weight in the range between about 400 and about 6000, and preferably between about 2000 and about 4000. The alkylene oxide can be present in the polyether polyol as a block, or randomly distributed, or as a topping, or any combination of these.

Particularly suitable in the preparation of the hydrophilic polyurethane foams of this invention are the oxyalkylated and cooxyalkylated branched polyols, such as oxyethylated glycerin, oxypropylated glycerine, oxybutylated glycerin and the like.

In preparing a polyurethane foam based on an ethylene oxide-alkyl phenol surfactant compound, the polyether polyol reactant is one having the following formula:

wherein R is a di-, tri- or tetra- or penta-valent organic radical, e.g., the organic moiety of diols such as ethylene glycol, propylene glycol, butylene glycol, pentane diol, hexane diol, etc.; triols such as glycerol, trimethylol propane, hexane triol, etc.; tetrols such as methyl glucoside and pentaerythritol; and pentols such as sorbitol; $n$ is an integer from 3 to 10; $x$ is an integer from 1 to a number selected so that the molecular weight of the polyol is in the range between about 400 and 6000; and $z$ is an integer from 2 to 5 which is equal to the valence of the R moiety. The oxyalkylated and cooxyalkylated branched polyols, such as oxypropylated glycerine, oxybutylated glycerine, etc. are likewise particularly suitable polyols for the preparation of polyurethane foams based on an ethylene oxide-alkyl phenol surfactant compound.

Any of the widely known organic polyisocyanates can be employed in the preparation of the polyurethane foams of this invention. An illustrative commercially available isocyanate is tolylene diisocyanate, which is a mixture of about 80 percent by weight of 2,4-tolylene diisocyanate and 20 percent by weight of the 2,6-isomers. Other typical isocyanates include, but are not limited to, the following: methylene-bis-(4-phenyl isocyanate), 3,3'-bitolylene-4,4'-diisocyanate, 3,3'-dimethoxy-4,4'-biphenylene diisocyanate, naphthalene-1,5-diisocyanate, hexamethylene diisocyanate, 1,4-phenylene diisocyanate, polyphenylene polymethylene isocyanate and the like. The amount of isocyanate employed in the preparation of the polyurethane foams should be sufficient to provide at least about 0.7 NCO group per hydroxyl group present in the reaction system. This includes the number of hydroxyl groups present in the polyether polyol and the surfactant compounds of the present invention, the number of hydroxyl groups in any additives employed, and the number of hydroxyl groups employed in the foaming agent. An excess of isocyanate compound may be conveniently employed; however, this is generally undesirable due to the high cost of the isocyanate compound. It is preferable, therefore, to employ sufficient isocyanate to provide no greater than about 1.5 NCO groups per hydroxyl group, and preferably between about 0.9 and 1.1 NCO groups per hydroxyl group.

The polyurethane foams are prepared in the presence of a foaming agent, reaction catalyst, and preferably a small proportion of a conventional silicone surfactant. The foaming agent employed can be any of those known to be useful for this purpose, such as water, which is preferred, as well as the halogenated hydrocarbons, and mixtures thereof. Typical halogenated hydrocarbons include, but are not limited to, the following: monofluorotrichloromethane, difluorodichloromethane, 1,1,2-trichloro-1,2,2-trifluoroethane, methylene chloride, chloroform, and carbon tetrachloride. The amount of foaming agent employed can be varied within a wide range. Generally, however, the halogenated hydrocarbons are employed in an amount from 1 to 50 parts by weight per 100 parts by weight of the polyether polyol of the present invention, and generally water is employed in an amount of from 0.1 to 10 parts by weight per 100 parts by weight of the polyether polyol.

The polyurethane foams are prepared in the presence of a catalytic amount of a reaction catalyst. The catalyst employed can be any of the catalysts known to be useful for this purpose, or mixture thereof, including tertiary amines and metallic salts. Typical tertiary amines include, but are not limited to, the following: N-methyl morpholine, N-hydroxyethyl morpholine, triethylene diamine, triethylamine and trimethylamine. Typical metallic salts include, for example, the salts of antimony, tin and iron, e.g. dibutyltin dilaurate, stannous octoate, and the like. Generally speaking, the catalyst is employed in an amount ranging between about 0.05 and about 1.0, and preferably between about 0.075 and about 0.15 percent by weight of the polyether polyol.

It is preferred in the preparation of the polyurethane compounds of the present invention to employ minor amounts of a conventional polyurethane foam surfactant in order to further improve the cell structure of the polyurethane foam. Typical of such surfactants are the silicone oils and soaps. Generally up to 2 parts by weight of the surfactant is employed per 100 parts of the polyether polyol. This addition supplements the aforesaid "surfactant compound."

Various additives can be employed which serve to provide different properties, e.g. fillers such as clay, calcium sulfate, or ammonium phosphate may be added to lower cost and improve physical properties. Ingredients such as dyes may be added for color, and fibrous glass, asbestos, cotton, ramie or synthetic fibers may be added for strength. In addition, plasticizers, deodorants and anti-oxidants may be added.

These components are reacted in the customary "one-shot" manner to yield a urethane foam which is water-wettable and which has a significantly higher water-retention capability than conventional polyurethane foams. However, if desired, the "prepolymer" technique, and "quasi" prepolymer technique may also be employed to prepare the novel foams of this invention.

Applications for hydrophilic urethane foams of this invention include household sponges, sponges and cleaning devices for other uses, disposable diapers, rollers for water-base paint, cartridges for absorption of urine, feminine personal products, applicators for deodorants, make-up and similar preparations and disposable cleaning and wiping uses.

The following examples are presented to illustrate the invention more fully without any intention of being limited thereby. All parts and percentages are by weight unless otherwise specified.

EXAMPLE 1

A polyether polyol was prepared by reacting glycerine with propylene oxide in the presence of potassium hydroxide to yield oxypropylated glycerin having a molecular weight of about 3000.

A glycidol-based surfactant was prepared by reacting nonyl phenol with glycidol in the presence of potassium hydroxide to yield a reaction product containing an average of nine moles of glycidol per mole of nonyl phenol.

The oxypropylated glycerin (100 parts) was mixed with the glycidol-based surfactant (4.11 parts), water (4.1 parts), stannous octoate catalyst (0.3 part), triethylene-diamine catalyst (0.1 part), trichlorofluoromethane (8.0 parts) and a conventional silicon surfactant (2.0 parts). The silicone surfactant employed is a block copolymer of a dimethyl polysiloxane and polyalkylene oxide. Toluene diisocyanate (50.8 parts) was added to the polyol blend and the reaction mixture stirred vigorously and then poured into a rectangular box.

The resulting foam had very good hydrophilic properties as demonstrated by the following test, wherein the "water pick-up," in grams of water per cubic inch of foam, was determined. A 1″ x 3″ x 5″ piece of the foam was maintained under controlled temperature and humidity conditions for 24 hours and then thoroughly worked under the surface of distilled water to insure complete penetration of water into the foam. The foam sample was then lifted from the water, allowed to drain for 15 seconds, dropped into a tared cup and weighed. The net weight of the sample was determined and divided by the volume of the foam, resulting in a water pick-up of 12.87 grams per cubic inch of foam. In grams of water per gram of foam, the water absorption was 35.02.

For purposes of comparison, foam was prepared from the same ingredients and in the same proportions as described above, but omitting the glycidol-based surfactant. The water-pickup of this foam was 8.01 grams of water per cubic inch of foam, or 21.20 grams of water per gram of foam.

EXAMPLE 2

An oxyethylated nonyl phenol was prepared by reacting nonyl phenol with ethylene oxide in the presence of potassium hydroxide to yield a reaction product containing nine moles of ethylene oxide per mole of nonyl phenol.

Following the procedure of Example 1, a foam was prepared from oxypropylated glycerin having a molecular weight of about 3000 (100 parts), the oxyethylated nonyl phenol surfactant (20 parts), water (4.0 parts), stannous octoate catalyst (0.4 part), triethylenediamine catalyst (0.1 part) trichlorofluoromethane (8.0 parts), a silicone surfactant (2.0 parts) and tolylene diisocyanate (50.2 parts). The silicone surfactant had the same composition as the surfactant of Example 1.

The resulting foam had a water pick-up of 12.44 grams per cubic inch of foam, or 29.96 grams of water per gram of foam, determined in accordance with the test procedure described in Example 1, thus demonstrating a marked superiority over the comparative foam discussed in Example 1.

We claim:
1. A process for preparing a hydrophilic polyurethane foam which comprises reacting
   (a) an organic polyisocyanate with
   (b) a polyether polyol in the presence of
   (c) a surfactant compound comprising the reaction product of between 1 and about 30 mols of glycidol with one mol of an alkyl phenol,
   (d) a reaction catalyst, and
   (e) a foaming agent:
said alkyl phenol having the formula

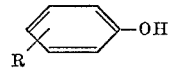

wherein R is an alkyl group having from 8–18 carbon atoms; and
said surfactant compound being present in an amount between about 1 and about 10 parts by weight per 100 parts by weight of the polyether polyol.

2. The process of claim 1 wherein said surfactant compound comprises the reaction product of glycidol with nonyl phenol.

References Cited

FOREIGN PATENTS 892,776    3/1962    Great Britain.

DONALD E. CZAJA, Primary Examiner

MICHAEL B. FEIN, Assistant Examiner

U.S. Cl. X.R.

15—244; 128—127, 156, 270, 284; 260—613